(12) United States Patent
Aoki

(10) Patent No.: US 7,398,112 B2
(45) Date of Patent: Jul. 8, 2008

(54) FOLDING CELL PHONE AND OTHER FOLDING MOBILE TERMINAL

(75) Inventor: Hiromasa Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 411 days.

(21) Appl. No.: 11/089,460

(22) Filed: Mar. 25, 2005

(65) Prior Publication Data

US 2005/0215297 A1    Sep. 29, 2005

(30) Foreign Application Priority Data

Mar. 29, 2004   (JP) ............................. 2004-096479

(51) Int. Cl.
*H04B 1/38* (2006.01)
(52) U.S. Cl. .............. 455/575.3; 455/575.1; 455/575.4; 455/90.3
(58) Field of Classification Search ................ 455/566, 455/575.1, 575.3, 575.4, 90.3
See application file for complete search history.

(56) References Cited

U.S. PATENT DOCUMENTS

| | | | | |
|---|---|---|---|---|
| 6,549,789 B1 * | 4/2003 | Kfoury | ..................... | 455/550.1 |
| 6,628,974 B1 * | 9/2003 | Lim | ......................... | 455/575.3 |
| 2003/0085804 A1 * | 5/2003 | Wang | ....................... | 340/388.1 |
| 2003/0119569 A1 | 6/2003 | Reed | ........................... | 455/575 |
| 2004/0198477 A1 * | 10/2004 | Jung et al. | ................ | 455/575.4 |
| 2004/0203493 A1 * | 10/2004 | Carlson | ..................... | 455/90.1 |
| 2004/0204122 A1 * | 10/2004 | Opela et al. | ................. | 455/565 |

FOREIGN PATENT DOCUMENTS

| | | |
|---|---|---|
| GB | 2 387 077 A | 3/2002 |
| GB | 2 387 078 A | 2/2003 |
| JP | 2003-298729 | 10/2003 |
| WO | WO 01/84729 A1 | 4/2001 |

OTHER PUBLICATIONS

Euripean Search Report Issued by the European Patent Office on Oct. 11, 2007, pp. 1 to 3.

* cited by examiner

*Primary Examiner*—Matthew Anderson
*Assistant Examiner*—Tuan Pham
(74) *Attorney, Agent, or Firm*—Whitham Curtis Christofferson & Cook, P.C.

(57) ABSTRACT

A problem has been resolved by providing a folding cell phone having a position detecting unit which detects the coupling state between the first frame part and the second frame part and a communication controlling unit which performs processing to control enabling or disabling of the configuration to stop the functions necessary for communication only, according to the results of detection by the position detecting unit.

5 Claims, 5 Drawing Sheets

FIG. 8
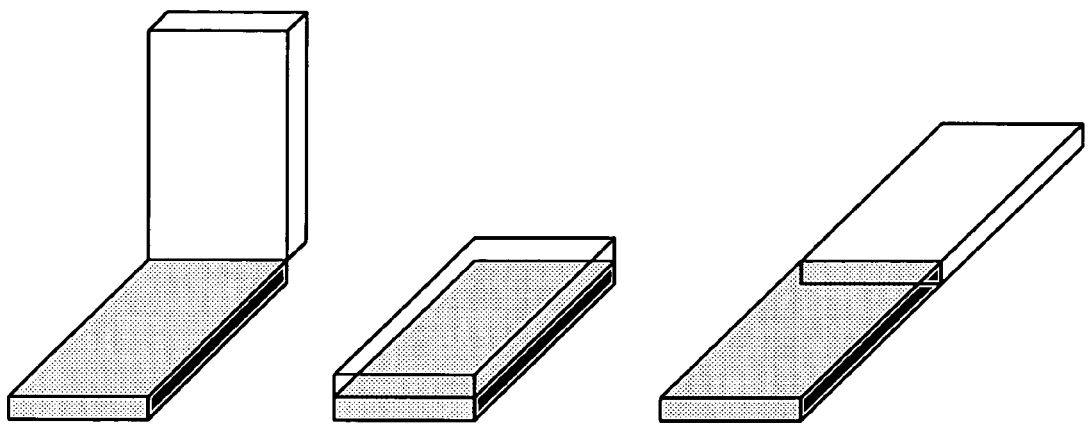
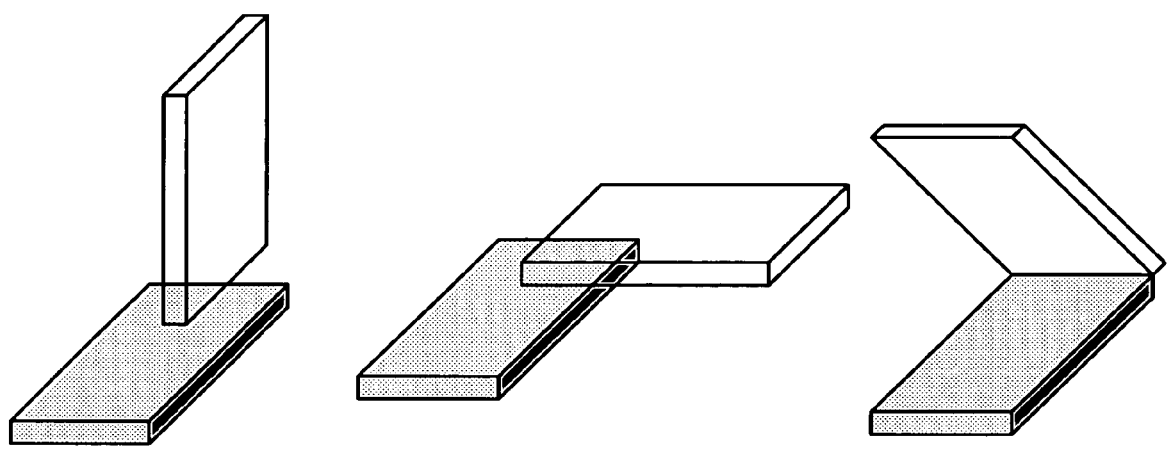

FOLDING CELL PHONE AND OTHER FOLDING MOBILE TERMINAL

BACKGROUNDS OF THE INVENTION

1. Field of the Invention

The present invention relates to a folding cell phone and other folding mobile terminal which allow the user to control enabling or disabling the configuration to stop the functions necessary for communication only, by changing the coupling state between the two frame parts of the cell phone or the mobile terminal.

2. Description of the Related Art

Talking on a cell phone may cause a nuisance to others, particularly in a public place, such as on a train. Most hospitals require people to turn off their cell phones within their buildings in order to prevent possible malfunction of medical equipment. Users may turn off their cell phones simply because they do not want to answer any calls.

In recent years, cell phones have become increasingly multifunctional; they commonly incorporate camera, notebook and various other features, in addition to calling and other functions for communication. In places where calling on cell phones is inhibited or where radio wave emitting functions must be turned off, users still may want to use the functions other than those necessary for communication.

Under these circumstances, the demand has been increasing rapidly for a cell phone which can restrict use of its functions necessary for communication only, while allowing the user to use the rest of the functions as usual.

Some cell phones available on the market can deactivate the functions necessary for communication only.

For example, Japanese laid-open patent application publication (Kokai) No. 2003-298729 (Literature 1) discloses a cell phone which allows the user to deactivate the functions necessary for communication by the operation of its output radio wave stop button.

However, these cell phones currently available on the market require the user to undergo a very complicated procedure before he or she can enable or disable the configuration to stop the functions necessary for communication only, inevitably leading to infrequent use of this option by the user.

Even on such a cell phone as disclosed in Literature 1 with an output radio wave stop button in a conspicuous place, it would be much more convenient if the user is not required to perform any key operation in order to enable or disable the configuration to stop the functions necessary for communication only. Some cell phone users may not be accustomed to key operation; others may have difficulties in using many operational keys; still others may be elderly people or the physically challenged. For these people, it would be a must that their cell phones have the ability to disable or enable the configuration to stop the functions necessary for communication only without performing any key operation.

SUMMARY OF THE INVENTION

The present invention has been developed to address the above-described problem. The object of the invention is to provide a folding cell phone and other folding mobile terminal, which allow the user to enable or disable the configuration to stop the functions necessary for communication only, simply by changing the coupling state between the two frame parts of the cell phone or the mobile terminal without any key operation, thereby ensuring the ease of turning off the functions necessary for communication only, even for those who are not accustomed to key operation, who have difficulties in using many operational keys, and who are elderly people or the physically challenged.

FIG. 8 is a diagram showing various examples of the coupling state between the two frame parts of the folding cell phone. As shown in FIG. 8, many folding cell phones available recently are capable of taking various coupling states between their multiple frame parts. Each of these states is designed to provide the user with the most appropriate user interface in using a particular feature. A particular feature herein is very often a function other than those necessary for communication. Examples of such a feature include taking pictures using the camera function that is incorporated as an accessory in the cell phone.

In light of these circumstances, the inventor considered that there should be a most appropriate state of a cell phone depending on the different states of the frame. The inventor then moved on to seeking the maximum ease for the user to set the cell phone to this most appropriate state. Based on these considerations, the inventor focused attention on the prospect that partial restriction of cell phone functionality, targeting the functions necessary for communication only, will generate benefits from the perspective of public manners.

After various considerations and reviews, the inventor reached a conclusion, which has led to the development of the present invention, that the above-described object can be realized by providing a folding cell phone having a position detecting unit which detects the coupling state between the first frame part and the second frame part and a communication controlling unit which performs processing to control enabling or disabling of the configuration to stop the functions necessary for communication only, according to the results of detection by the position detecting unit.

According to one aspect of the invention, a folding mobile terminal having a first frame part which incorporates a displaying part, a second frame part which incorporates an operating part, and a coupling member which couples the first frame and the second frame for free opening and closing movement, comprises a position detecting unit which detects the coupling state between the first frame part and the second frame part, and a communication controlling unit which performs processing to control enabling or disabling of the configuration to stop the functions necessary for communication only, according to the coupling state detected by the position detecting unit.

In the preferred construction, the coupling member is constituted so as to allow free opening and closing movement and free rotational movement of the first frame part and the second frame part.

In another preferred construction, the coupling member is a rotary biaxial hinge.

In another preferred construction, the position detecting unit comprises a magnet, which is provided at a specific location inside either of the first frame part or the second frame part, and a magnetic detector, which is provided at a specific location inside the frame part with no magnet provided.

In another preferred construction, a plurality of the magnetic detecting unit are provided at the specific locations.

In another preferred construction, the magnetic detector also serves as a switch between on an off depending on the magnitude of the magnetic force detected.

In another preferred construction, the magnetic detector also serves as a switch between on an off depending on the magnitude of the magnetic force detected, and the communication controlling unit performs processing to control enabling or disabling of the configuration to stop the functions necessary for communication only, only if the pre-set magnetic detector has switched from off to on.

In another preferred construction, the folding mobile terminal is a folding cell phone provided with the position detecting unit and the communication controlling unit.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 8 is a diagram showing various examples of the coupling state between the two frame parts of the folding cell phone.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
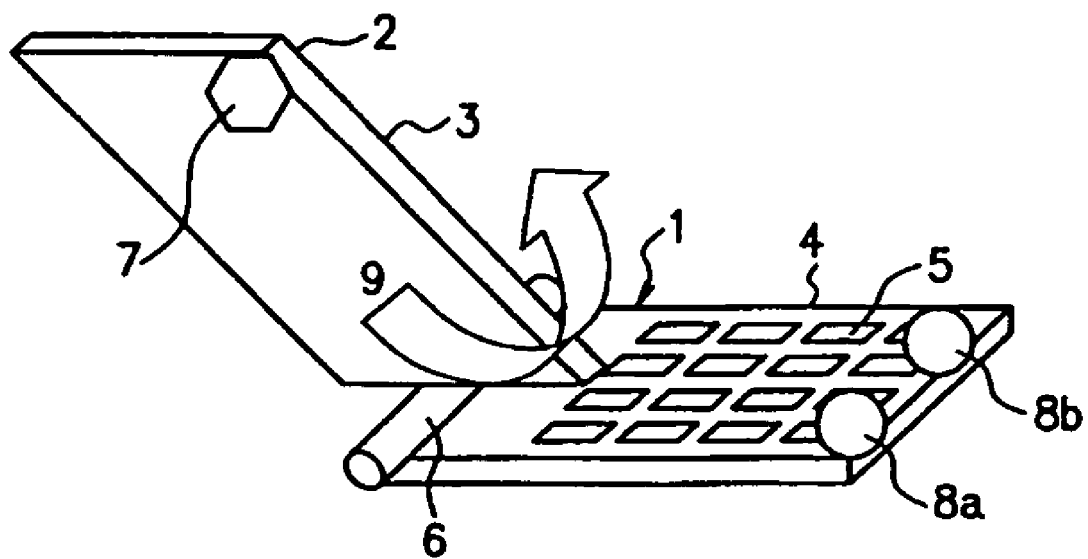
FIG. 1 is a schematic diagram showing a folding cell phone according to one embodiment of the present invention.

FIG. 1 is a schematic diagram showing a folding cell phone according to one embodiment of the present invention. The folding cell phone 1 shown in FIG. 1 comprises a first frame part 2 which incorporates a displaying part 3, a second frame part 4 which incorporates an operating part 5, and a rotary biaxial hinge 6 which serves as a coupling member which allows free opening and closing movement and free rotational movement of the first frame part 2 and the second frame part 4.

While this embodiment is an example of applying the present invention to a folding cell phone, it will be readily appreciated that the present invention can also be applied to any folding mobile terminal other than cell phones, such as a PDA.

Inside the two frame parts, i.e., the first frame part 2 and the second frame part 4, a magnet 7 for use as a position detecting means, lead switches 8a and 8b for use as magnetic detectors, and a communication function controlling part (not shown) are provided, respectively.

The first frame 2 and the second frame 4 can take various coupling states, as shown in FIG. 8, by the operation of the rotary biaxial hinge 6. These two frames can be opened and closed freely and rotated in two directions.

The magnet 7 is located inside the frame part, near the corner of the edge of the first frame 2 that is opposite from the one to which the rotary biaxial hinge 6 is attached. The lead switches 8a and 8b are located inside the frame part, near the corners of the edge of the second frame 4 that is opposite from the one to which the rotary biaxial hinge 6 is attached. The lead switches 8a and 8b are so designed as to switch between on and off depending on the magnitude of the magnetic force detected.

The location of the magnet 7 can be anywhere inside the frame part, regardless of the first frame part 2 or the second frame part 4. However, from the perspective of ensuring increased accuracy in identifying the coupling state of the two frame parts, it is desirable to place the magnet 7 inside one of the frame parts and, for example, near the corner of the edge that is opposite from the one to which the rotary biaxial hinge 6, a coupling member between the two frame parts, is attached.

In addition to the lead switches, examples of magnetic detector which also serves as a switch to switch between on an off depending on the magnitude of the magnetic force detected, include magnetic sensors (Hall-effect elements), conventionally known mechanical switches, and the like.

Figure 2:
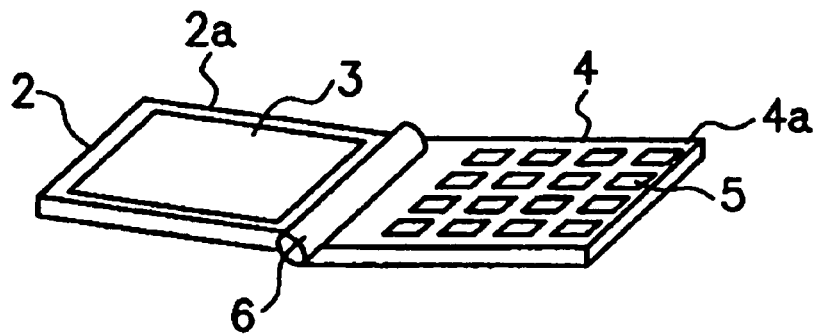
FIG. 2 is a diagram showing an example of the appearance of the folding cell phone according to the present invention when it is opened.
Figure 3:
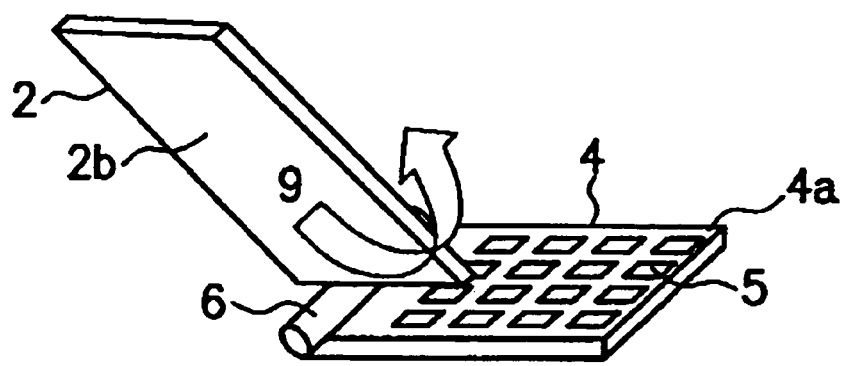
FIG. 3 is a diagram showing an example of the appearance of the folding cell phone according to the present invention when the first frame part is rotated in the direction indicated by the arrow.
Figure 4:
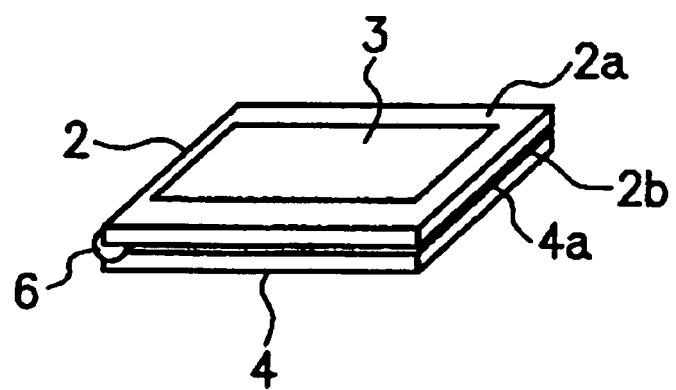
FIG. 4 is a diagram showing an example of the appearance of the folding cell phone according to the present invention when it is closed by putting together the outer face of the first frame and the surface of the second frame.

FIGS. 2, 3, and 4 show an example of the varying coupling states between the two frame parts of the present invention, which cause the configuration to stop the functions necessary for communication only to be disabled or enabled.

In this example, enabling or disabling the configuration to stop the functions necessary for communication only is achieved as follows. While the folding cell phone is opened (FIG. 2), the user rotates the first frame part 2 180 degrees in the direction indicated by the arrow 9 (FIG. 3). Then the user closes the two frame parts so that the outer face 2b of the first frame part 2, which does not incorporate a displaying part 3, and the surface 4a of the second frame part 4, which incorporates an operating face 5, are put together (FIG. 4).

In the present invention, the folding cell phone can be made to behave the other way round. That is, enabling or disabling the configuration to stop the functions necessary for communication only is achieved by closing the two frame parts so that the inner face 2a of the first frame part 2, which incorporates a displaying part 3, and the surface 4a of the second frame part 4, which incorporates an operating face 5, are put together.

Figure 5:
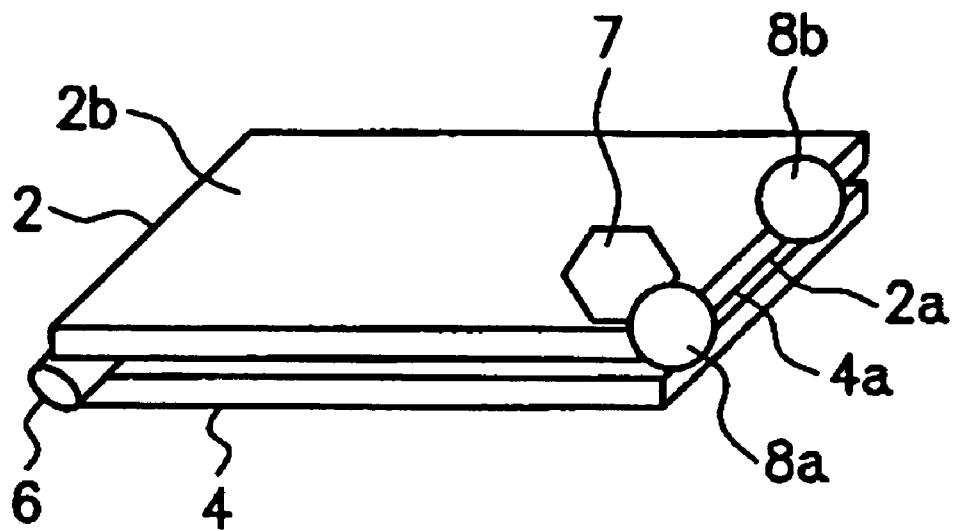
FIG. 5 is a diagram showing an example of the appearance of the folding cell phone according to the present invention when it is closed by putting together the inner face of the first frame and the surface of the second frame.
Figure 6:
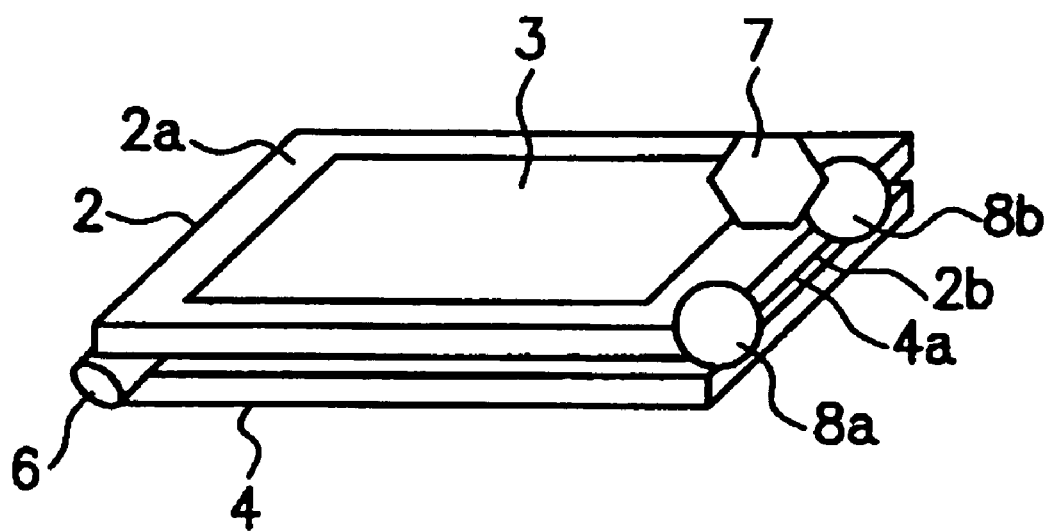
FIG. 6 is a diagram showing another example of the appearance of the folding cell phone according to the present invention when it is closed by putting together the outer face of the first frame and the surface of the second frame.

FIGS. 5 and 6 show the different positional relationships among the magnet 7, which serves as a position detecting means, and the lead switches 8a and 8b, as the two frame parts change in the coupling state between them.

When the two frame parts are closed with the inner face 2a of the first frame part 2 and the surface 4a of the second frame part 4 put together, the magnet 7 is located roughly above the lead switch 8a (FIG. 5). On the other hand, when the two frame parts are closed with the outer face 2b of the first frame part 2 and the surface 4a of the second frame part 4 put together, the magnet 7 is located roughly above the lead switch 8b (FIG. 6).

Changing the coupling state between the two frame parts from the one as shown in FIG. 5 to the one as shown FIG. 6 causes the lead switch 8a to receive a significantly reduced magnetic force and consequently to change from on to off. At the same time, the magnetic force that the lead switch 8b receives increases significantly, causing the lead switch 8b to change from off to on. When the lead switch 8a or 8b is changed over between on and off, electric signals indicative of the changeover and the current on/off state is sent to the communication function controlling part.

Figure 7:
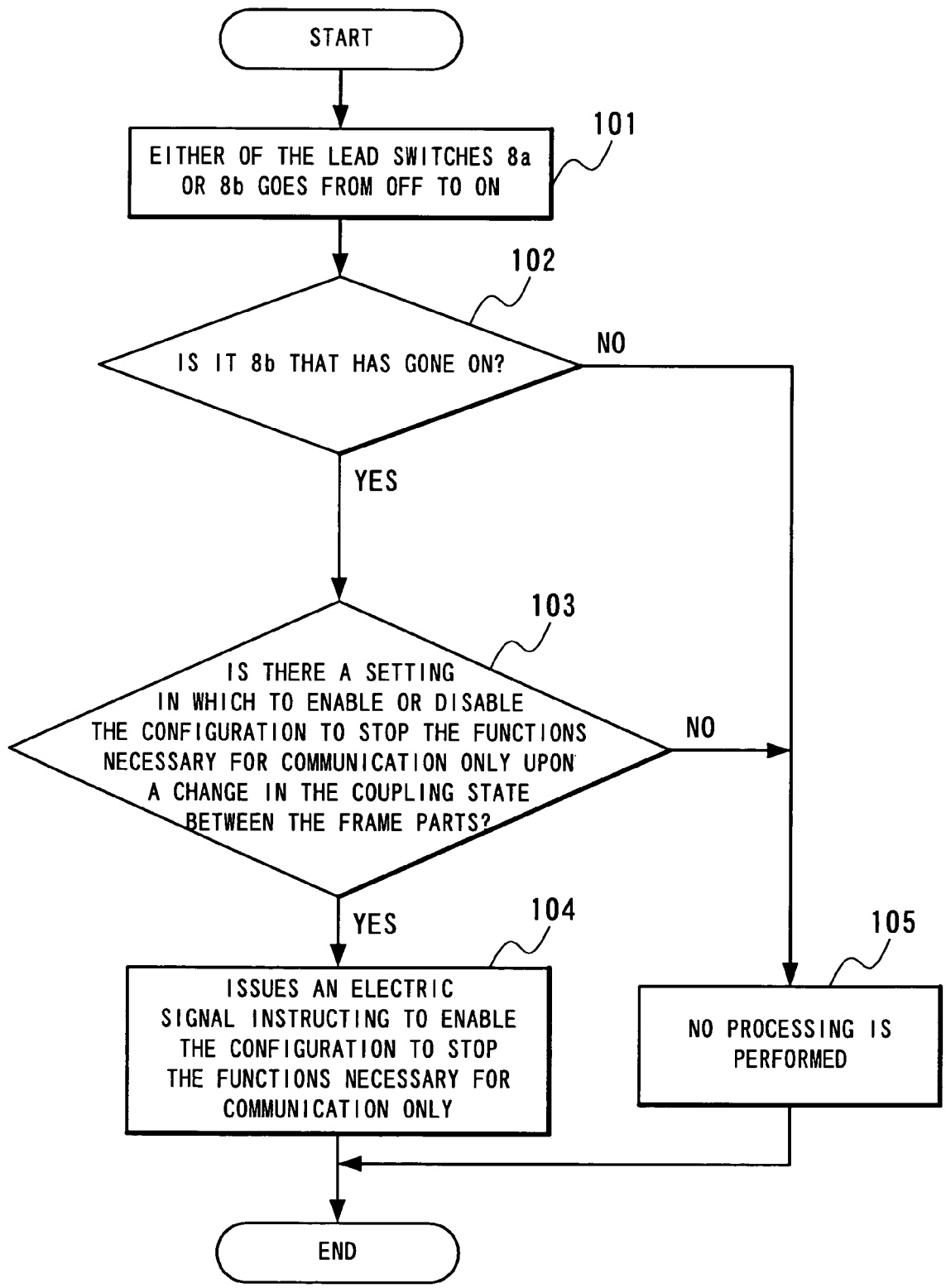
FIG. 7 is a flow chart explaining an example of the processing steps performed by the communication function controlling part of the folding cell phone according to the present invention.

An example of the processing steps performed by the communication function controlling part of the folding cell phone according to the present invention will now be explained with reference to FIG. 7.

When either the lead switch 8a or 8b changes from off to on (Step 101), the communication function controlling part determines if the lead switch 8b has changed from off to on (Step 102).

Assume, for example, that the magnet 7 and the lead switches 8a and 8b are located at the positions indicated in FIG. 3. If the two frame parts, while they are closed, changes in their coupling state from the one in which the inner face 2a of the first frame part 2 and the surface 4a of the second frame part 4 are put together (FIG. 5) to the one in which the outer face 2b of the first frame part 2 and the surface 4a of the second frame part 4 are put together (FIG. 6), then the lead switch 8b changes from off to on. If, on the other hand, the coupling state between the two frame parts changes from the one shown in FIG. 6 to the one shown in FIG. 5, then the lead switch 8a changes from off to on.

If the lead switch 8b changes from off to on (Step 102/Yes), the controlling part in the communication controlling unit checks the memory within the folding cell phone for the setting in which to enable or disable the configuration to stop the functions necessary for communication only upon a change in the coupling state between the frame parts (Step 103).

If the cell phone has been set up to enable or disable the configuration to stop the functions necessary for communication only upon a change in the coupling state between the frame parts (Step 103/Yes), the controlling part within the communication function controlling part issues to the hardware controlling part of the folding cell phone an electric signal instructing it to force a stoppage of the functions necessary for communication only (Step 104).

By this, the configuration of the folding cell phone to stop the functions necessary for communication only can be enabled simply by changing the coupling state between the two frame parts, without needing any key operation.

If the cell phone has not been set up to enable or disable the configuration to stop the functions necessary for communication only upon a change in the coupling state between the frame parts (Step 103/No), the controlling part within the communication function controlling part does not perform processing to control enabling or disabling of the configuration of the functions necessary for communication only (Step 105).

When the lead switch 8a changes from off to on (Step 102/No), the communication function controlling part does not perform processing to control enabling or disabling of the configuration to stop the functions necessary for communication only (Step 105). By adopting the configuration as described above, it becomes possible to prevent effectively malfunctions or other undesirable operation.

This configuration also contributes to increased accuracy in controlling enabling or disabling of the configuration to stop the functions necessary for communication only.

Disabling the configuration to stop the functions necessary for communication only can also be achieved in a similar process as described above.

By using a constitution in which multiple lead switches are provided to serve as magnetic detectors, it becomes possible to achieve even higher accuracy in identifying the coupling state between the two frame parts, in particular in a biaxial folding cell phone.

The setting method that the folding cell phone according to the present invention provides is much more convenient than the existing setting methods because the user can enable or disable the configuration to stop the functions necessary for communication only, simply by changing the coupling state between the two frame parts without any key operation.

This folding cell phone thus provides the ease of enabling or disabling the configuration to stop the functions necessary for communication only, even for those who are not accustomed to key operation, who have difficulties in using many operational keys, and who are elderly people or the physically challenged.

The folding cell phone of the present invention has the advantage of being able to provide a feature to enable or disable the configuration to stop the functions necessary for communication only, without defining an additional function on the operating face.

The folding cell phone of the present invention is also expected to contribute to an improvement in public manners among cell phone users because it requires fewer steps than the existing setting methods.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. The folding mobile terminal comprising:
a first frame part which incorporates a displaying part;
a second frame part which incorporates an operating part;
a coupling member which couples the first frame part and the second frame part for free opening and closing movement;
a position detecting unit which detects a coupling state between said first frame part and said second frame part, said position detecting unit comprises a magnet, which is provided at a specific location inside either of said first frame part or said second frame part, and a magnetic detector, which is provided in a specific location inside the frame part with no magnet provided, wherein the position detecting unit serves as a switch between on and off depending on the magnitude of a magnetic force detected; and
a communication controlling unit which performs processing to control enabling or disabling of the configuration to stop functions necessary for communication only, only if the coupling state detected by the position detecting unit causses the position detecting unit to switch from off to on, wherein said communication controlling unit performs processing to control enabling or disabling of the configuration to stop the functions necessary for communication only, only if a pre-set magnetic force has caused the position detecting unit to be switched from off to on.

2. The folding mobile terminal as set forth in claim 1, wherein said coupling member is constituted so as to allow free opening and closing movement and free rotational movement of said first frame part and said second frame part.

3. The folding mobile terminal as set forth in claim 2, wherein said coupling member is a rotary biaxial hinge.

4. The folding mobile terminal as set forth in claim 1, wherein a plurality of position detecting units are provided at specific locations on said first or second frame parts.

5. The folding mobile terminal as set forth in claim 1, wherein said folding mobile terminal is a folding cell phone provided with said position detecting unit and said communication controlling unit.

* * * * *